(12) United States Patent
Cinpinski et al.

(10) Patent No.: US 8,336,511 B2
(45) Date of Patent: Dec. 25, 2012

(54) METHOD AND SYSTEM FOR CONTROLLING A CAM PHASER

(75) Inventors: Kenneth J. Cinpinski, Ray, MI (US);
Donovan L. Dibble, Utica, MI (US);
Gregory J. York, Fenton, MI (US);
Joshua Cowgill, Brighton, MI (US);
Joseph R. Dulzo, Novi, MI (US)

(73) Assignee: GM Global Technology Operations LLC

( * ) Notice: Subject to any disclaimer, the term of this patent is extended or adjusted under 35 U.S.C. 154(b) by 435 days.

(21) Appl. No.: 12/435,782

(22) Filed: May 5, 2009

(65) Prior Publication Data

US 2010/0282192 A1    Nov. 11, 2010

(51) Int. Cl.
*F01L 1/34* (2006.01)

(52) U.S. Cl. .................................. 123/90.16; 123/90.15

(58) Field of Classification Search ............... 123/90.15, 123/90.17, 90.31, 90.16
See application file for complete search history.

(56) References Cited

U.S. PATENT DOCUMENTS

| 2003/0131814 A1* | 7/2003 | Tsujimura et al. ......... 123/90.17 |
| 2008/0288155 A1* | 11/2008 | Watanabe et al. ............. 701/102 |

* cited by examiner

*Primary Examiner* — Zelalem Eshete (57) ABSTRACT

A method and control module includes a control hold duty cycle module generating a control hold duty cycle signal and a voltage correction module generating a voltage correction signal. The control module also includes a correction module generating a corrected proportional correction signal based on a proportional correction signal and the voltage correction signal, and generating a corrected integral correction signal based on an integral correction signal and the voltage correction signal. The control module also includes a force determination module controlling a duty cycle to a phaser operator based upon the control hold signal, the corrected proportional correction signal and the corrected integral correction signal.

19 Claims, 6 Drawing Sheets

METHOD AND SYSTEM FOR CONTROLLING A CAM PHASER

FIELD OF THE DISCLOSURE

The present disclosure relates to variable valve actuation systems, and more particularly to systems for variable valve actuation systems.

BACKGROUND OF THE DISCLOSURE

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating cam shaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift).

Variable valve actuation (WA) technology improves fuel economy, engine efficiency, and/or performance by modifying a valve lift event, timing, and duration as a function of engine operating conditions. Two-step WA systems include variable valve assemblies such as hydraulically controlled switchable roller finger followers (SRFFs). SRFFs enable two discrete valve states (e.g. a low lift state or a high lift state) on the intake and/or exhaust valves.

Figure 1:
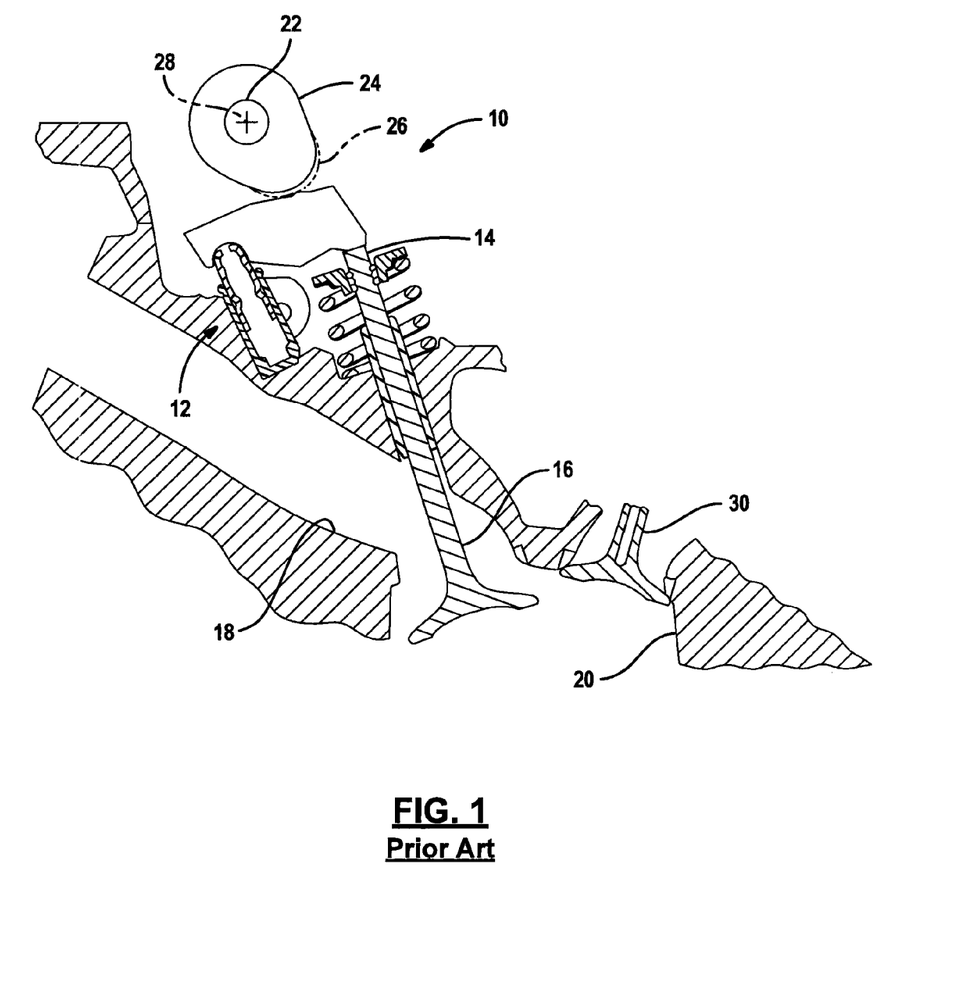
FIG. 1 is a cross sectional view of an exemplary hydraulic lift mechanism according to the prior art.

Referring to FIG. 1, a hydraulic lift mechanism (i.e. a SRFF mechanism) 10 is shown in more detail. Those skilled in the art can appreciate that the SRFF mechanism 10 is merely exemplary in nature. The SRFF mechanism 10 is pivotally mounted on a hydraulic lash adjuster 12 and contacts the valve stem 14 of an inlet valve 16 that selectively opens and closes an inlet passage 18 to a cylinder 20. The engine inlet valve 16 is selectively lifted and lowered in response to rotation of an inlet camshaft 22 on which multiple cam lobes (e.g. low lift cam lobe 24 and high lift cam lobe 26) are mounted. The inlet camshaft 22 rotates about an inlet camshaft axis 28. Although the exemplary embodiment describes the SRFF mechanism 10 operating on the engine inlet valve 16, those skilled in the art can appreciate that a SRFF mechanism may operate similarly on an exhaust valve 30.

A control module transitions a SRFF mechanism from a low lift state to a high lift state and vice versa based on demanded engine speed and load. For example, an internal combustion engine operating at an elevated engine speed such as 4,000 revolutions per minute (RPMs) typically requires the SRFF mechanism to operate in a high lift state to avoid potential hardware damage to the internal combustion engine.

Hydraulic cam phaser movement and positioning is achieved by controlling the flow of oil to the cam actuator such as a phaser. The flow control is done with a valve capable of supplying oil to a volume on one side of a vane in a phaser while simultaneously providing a path for the volume on the other side of the vane to vent or return to a tank. The rate of oil flow is a function of the area of the flow port that is exposed. The control of the flow is achieved by varying the amount of force applied to the valve spool which may be obtained from a solenoid. The solenoid is in communication with an electrical source. During operation of the vehicle, even those equipped with a regulated voltage control, the supply voltage may vary. For example, the voltage supplied by the voltage supply may vary between 11.5 and 14.5 volts. A changing supply voltage affects the accuracy of the oil supplied to the phaser.

SUMMARY

The present disclosure controls the force provided by a solenoid of an oil control valve to remain nearly constant when the supply voltage varies.

In one aspect of the disclosure, a method includes controlling an oil flow to a cam phaser through an oil control valve having an operator, generating a force at the operator using a voltage from a voltage supply, varying the voltage from the voltage supply, generating a voltage correction factor based on the voltage and maintaining the force on the operator using the correction factor.

In yet another aspect of the disclosure, a method of controlling a cam phaser includes generating a control hold signal, generating a voltage correction signal, generating a proportional correction signal, generating a corrected proportional correction signal based on the proportional correction signal and the voltage correction signal, generating an integral correction signal, generating a corrected integral correction signal based on the integral correction signal and the voltage correction signal and controlling a duty cycle to a phaser operator based upon the control hold signal, the corrected proportional correction signal and the corrected integral correction signal.

In yet another aspect of the disclosure, a control module includes a control hold duty cycle module generating a control hold duty cycle signal and a voltage correction module generating a voltage correction signal. The control module also includes a correction module generating a corrected proportional correction signal based on a proportional correction signal and the voltage correction signal, and generating a corrected integral correction signal based on an integral correction signal and the voltage correction signal. The control module also includes a force determination module controlling a duty cycle to a cam operator based upon the control hold signal, the corrected proportional correction signal and the corrected integral correction signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the preferred embodiment is merely exemplary in nature and is in no way intended to limit the disclosure, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
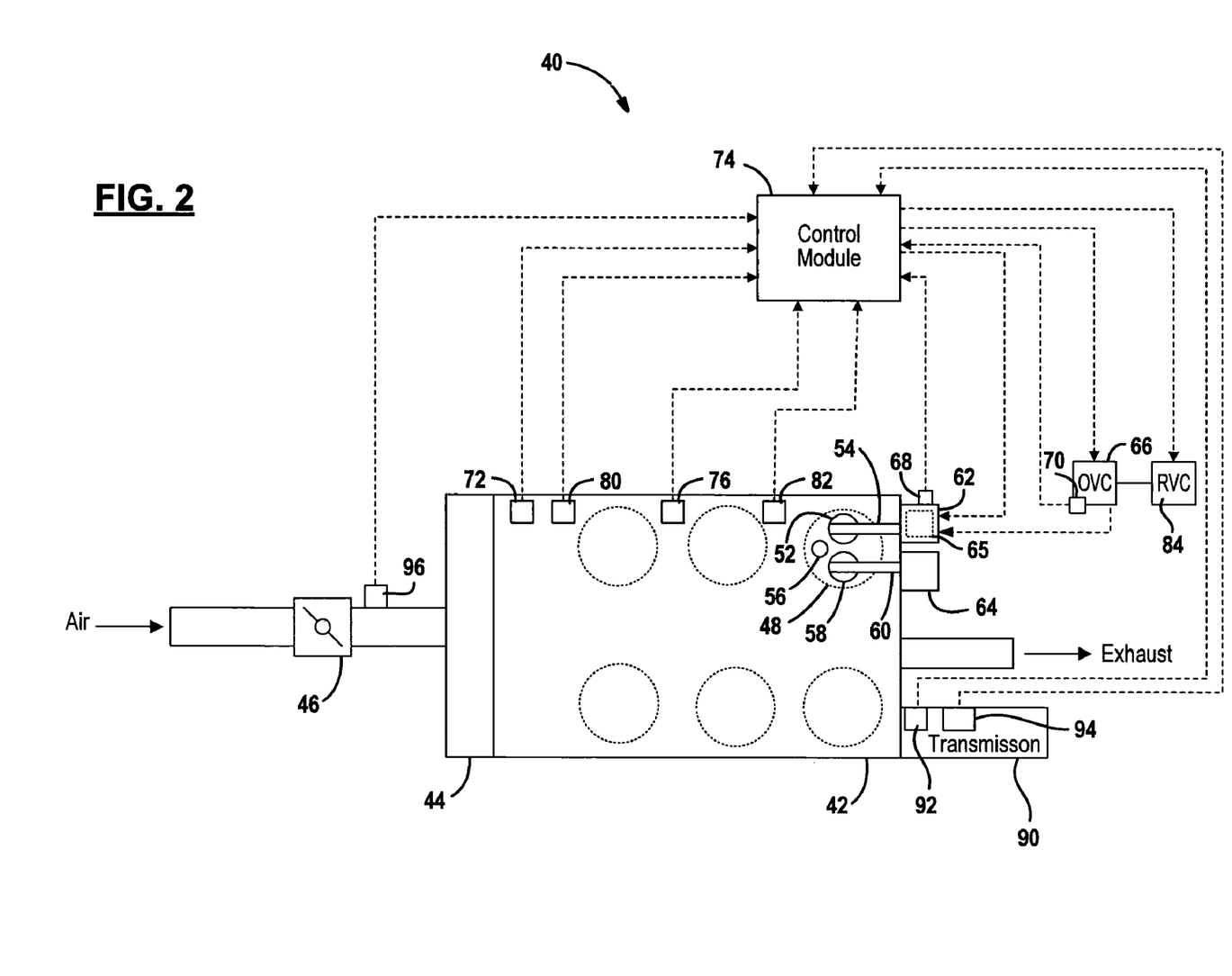
FIG. 2 is a functional block diagram of an exemplary vehicle including a control system according to the present disclosure.

Referring now to FIG. 2, an engine system 40 includes an engine 42 that combusts an air and fuel mixture to produce drive torque. Air is drawn into an intake manifold 44 through a throttle 46. The throttle 46 regulates mass air flow into the intake manifold 44. Air within the intake manifold 44 is distributed into cylinders 48. Although six cylinders 48 are illustrated, it is appreciated that the diagnostic system of the present disclosure can be implemented in engines having a plurality of cylinders including, but not limited to 2, 3, 4, 5, 8, 10, and 12 cylinders.

A fuel injector (not shown) injects fuel that is combined with the air as it is drawn into the cylinder 48 through an intake port. The fuel injector may be an injector associated with an electronic or mechanical fuel injection system, a jet or port of a carburetor or another system for mixing fuel with intake air. The fuel injector is controlled to provide a desired air-to-fuel (A/F) ratio within each cylinder 48.

An intake valve 52 selectively opens and closes to enable the air/fuel mixture to enter the cylinder 48. The intake valve position is regulated by an intake camshaft 54. A piston (not shown) compresses the air/fuel mixture within the cylinder 48. A spark plug 56 initiates combustion of the air/fuel mixture, driving the piston in the cylinder 48. The piston drives a crankshaft (not shown) to produce drive torque. Combustion exhaust within the cylinder 48 is forced out an exhaust port when an exhaust valve 58 is in an open position. The exhaust valve position is regulated by an exhaust camshaft 60. The exhaust is treated in an exhaust system. Although single intake and exhaust valves 52 and 58 are illustrated, it can be appreciated that the engine 42 can include multiple intake and exhaust valves 52 and 58 per cylinder 48.

The engine system 40 may include an intake cam phaser 62 and an exhaust cam phaser 64 that respectively regulate the rotational timing of the intake and exhaust camshafts 54 and 60. More specifically, the timing or phase angle of the respective intake and exhaust camshafts 54 and 60 can be retarded or advanced with respect to each other or with respect to a location of the piston within the cylinder 48 or with respect to crankshaft position.

In this manner, the position of the intake and exhaust valves 52 and 58 can be regulated with respect to each other or with respect to a location of the piston within the cylinder 48. By regulating the position of the intake valve 52 and the exhaust valve 58, the quantity of air/fuel mixture ingested into the cylinder 48, and therefore the engine torque, is regulated.

The cam phaser 62 can include a phaser actuator 65 that is either electrically or hydraulically actuated. Hydraulically actuated phaser actuators 65, for example, include an electrically-controlled fluid control valve (OCV) 66 that controls a fluid supply flowing into or out of the phaser actuator 65.

Additionally, low lift cam lobes (not shown) and high lift cam lobes (not shown) are mounted to each of the intake and exhaust camshafts 54, 60. The low lift cam lobes and high lift cam lobes rotate with the intake and exhaust camshafts 54 and 60 and are in operative contact with a hydraulic lift mechanism such as a switching roller finger follower (SRFF) mechanism as depicted in FIG. 1. Typically, distinct SRFF mechanisms operate on each of the intake and exhaust valves 52 and 58 of each cylinder 48. In the present implementation, each cylinder 48 includes two SRFF mechanisms.

Each SRFF mechanism provides two levels of valve lift for one of the intake and exhaust valves 52 and 58. The two levels of valve lift include a low lift and high lift and are based on the low lift cam lobes and high lift cam lobes, respectively. During "normal" operation (i.e. low lift operation or a low lift state), a low lift cam lobe causes the SRFF mechanism to pivot to a second position in accordance with the prescribed geometry of the low lift cam lobe and thereby open one of the intake and exhaust valves 52 and 58 a first predetermined amount. During high lift operation (i.e. a high lift state), a high lift cam lobe causes the SRFF mechanism to pivot to a third position in accordance with the prescribed geometry of the high lift cam lobe and thereby opening one of the intake and exhaust valves 52 and 58 to open a second predetermined amount greater than the first predetermined amount.

A position sensor 68 senses a position of the cam phaser 62 and generates a cam phaser position signal indicative of the position of the cam phaser 62. A pressure sensor 70 generates a pressure signal indicating a pressure of the fluid supply supplied to the phaser actuator 65 of the cam phaser 62. It is anticipated that one or more pressure sensors 70 can be implemented. An engine speed sensor 72 is responsive to a rotational speed of the engine 42 and generates an engine speed signal in revolutions per minute (RPM).

A control module 74 includes a processor and memory such as random access memory (RAM), read-only memory (ROM), and/or other suitable electronic storage. The control module 74 communicates with the position sensor 68, the pressure sensor 70, and the engine speed sensor 72. The control module 74 may receive input from other sensors 76 of the exemplary vehicle 40 including, but not limited to, oxygen sensors, engine coolant temperature sensors, and/or mass airflow sensors.

The control module 74 executes a diagnostic system of the present disclosure. The diagnostic system detects a failure state of one of the SRFF mechanisms of the engine 42 based at least on the engine speed and pressure signals transmitted from the speed sensor 72 and the pressure sensor 70, respectively. More specifically, the diagnostic system identifies one of the cylinders 48 associated with the failed SRFF mechanism, thereby enabling the control module 74 to command remedial actions (e.g. limiting engine speed) in order to prevent damage to the engine 42.

An oil temperature sensor 80 may also be in communication with the control module 74. The oil temperature sensor generates an oil temperature signal corresponding to the temperature of the oil within the engine 42.

A coolant temperature sensor 82 may also be in communication with the control module 74. The coolant temperature sensor 82 generates a coolant temperature signal corresponding to the coolant temperature within the engine 42. While discrete sensors 80 and 82 are provided, the coolant temperature or the oil temperature sensor may be signals determined using a model based on various sensor inputs.

The oil control valve 66 may be powered by a regulated voltage control module 84 that has an actual voltage output. The typical or rated voltage from the regulated voltage control module 84 may be referred to as nominal voltage whereas the actual output voltage of the regulated voltage control module may vary over time. The regulated voltage control module 84 may have a range, for example, between 11.5 and 14.5 volts. The change in the output voltage of the regulated voltage control module may result in a different force being applied to the solenoid operating the oil control valve 66. Details of the oil control valve circuitry are illustrated in FIG. 3 below.

The engine 42 may be in communication with a transmission 90. The transmission 90 may include a transmission oil temperature sensor 92 that communicates a transmission oil temperature signal to the control module 74. The transmission 90 may also include a vehicle speed sensor 94 that generates a vehicle speed signal and communicates the vehicle speed signal to the control module 74. Or course, other locations for a vehicle speed signal 94 may be incorporated within the vehicle including wheel speed sensors.

An inlet air temperature sensor 96 located within the air intake generates an inlet temperature signal corresponding to the inlet air temperature. The inlet temperature signal is communicated to the control module 74.

Figure 3:
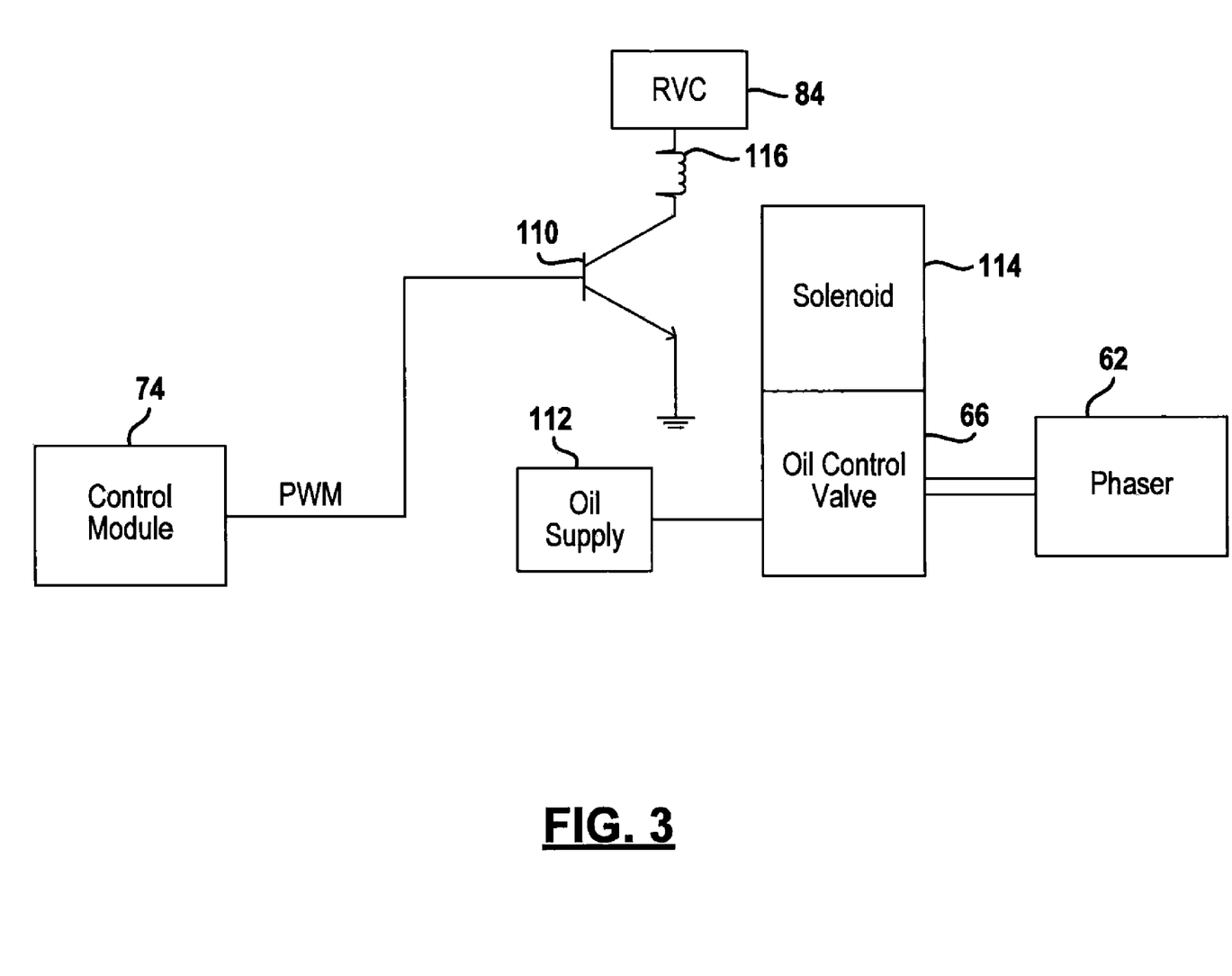
FIG. 3 is a detailed block diagrammatic representation of the oil control valve and control module 74.

Referring now to FIG. 3, a simplified view of the control module 74 and the oil control valve 66 is illustrated relative to a phaser 62. The control module 74 controls a switch 110 using a pulse width modulated (PWM) signal. The oil control valve 66 meters a control fluid such as oil from an oil supply 112 through the activation of a solenoid 114. The solenoid 114 is positioned based upon the level of current passing through a corresponding coil 116. The current is based on the actual voltage from the RVC. The control signal may be a pulse-width modulated signal. As the pulse-width modulated signal increases the current through the coil 116, the solenoid 114 opens to allow a hydraulic pressure to be communicated to the phaser 62. The amount of current passing through the coil 116 is affected by the fluctuation in voltage from the regulated voltage control module 84.

Figure 4:
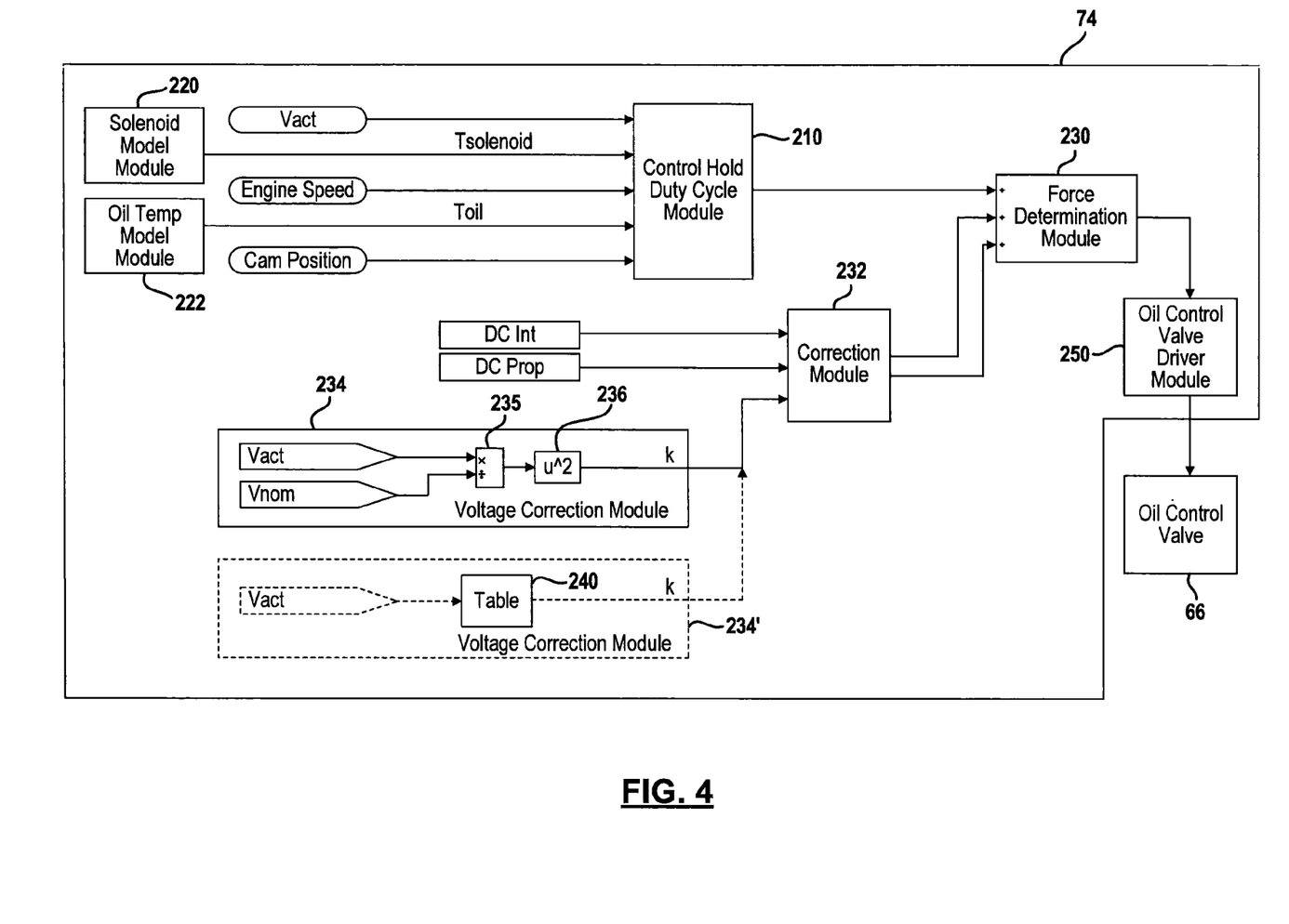
FIG. 4 is a block diagrammatic view of the control module of FIGS. 2 and 3.

Referring now to FIG. 4, the control module 74 is illustrated in further detail. The control module 74 may include a control hold duty cycle module 210. The control hold duty cycle may receive various signals including the actual voltage signal ($V_{act}$) used for controlling the solenoid 114. The actual voltage signal ($V_{act}$) may be different than the nominal voltage signal provided by the regulated voltage control module 84.

The control hold duty cycle module 210 may also receive a temperature signal corresponding to the temperature of the solenoid. The temperature of the solenoid may be directly determined using a temperature sensor or using a solenoid model module 220. The solenoid model module 220 may use various inputs for determining the solenoid temperature including the induction air inlet temperature, the engine coolant temperature, the transmission oil temperature, the engine oil temperature, the vehicle speed and any corresponding offset terms. One or more of the various conditions above may be used for determining the solenoid temperature.

The control hold duty cycle module 210 may also receive an engine speed signal from an engine speed sensor. The engine speed signal may be generated from a crankshaft position sensor.

The control hold duty cycle module 210 may also receive a temperature signal corresponding to the temperature of the engine oil. The oil temperature model module 222 may generate the oil temperature signal. The oil temperature model module may also use various inputs such as the vehicle speed and load conditions for the oil temperature determination. Direct sensors may also be used for the oil temperature.

The control hold duty cycle module 210 may also receive a cam position signal corresponding to the position of the camshaft. More specifically, the cam position signal may correspond to a target cam position for the phaser in cam degrees from the park position where a cam pin engages. The control hold duty cycle module 210 generates a control hold duty cycle signal and communicates the control hold duty cycle signal to a force determination module 230.

The control module 74 may be a proportional-integral module (PI). The control hold duty cycle may thus be corrected using a proportional correction ($DC_{prop}$) and an integral correction ($DC_{int}$). A correction module 232 receives the proportional correction and the integral correction.

The correction module 232 may also be in communication with a voltage correction module 234. The voltage correction module 234 may receive the actual voltage ($V_{ACT}$) and the nominal voltage ($V_{nom}$) and generates an output k corresponding to a voltage correction. A combination box 235 may arithmetically combine the actual and nominal voltages. The voltage correction k allows the proportional correction and the integral correction to be corrected to a corrected proportional correction signal and a corrected integral correction signal based upon the actual voltage. Thus, the output of the correction module is a corrected proportional correction signal and a corrected integral correction signal, both of which are provided to the force determination module 230.

A second way to correct voltage using a voltage correction module 234' is illustrated as an alternative. In this embodiment, an actual voltage $V_{act}$ is used to look up a signal from a look-up table 240. Again, the output of the voltage correction module 234' is the voltage correction k. As will be further described below, the square of the voltage correction may be used in the correction module 232. Squaring of the voltage correction k may take place within the voltage correction module such as at box 236 or within the correction module 232.

The force determination module 230 determines the force applied to the oil control valve driver module 250. The oil control valve driver module 250 is illustrated as within the control module 74. However, the oil control valve driver module 250 may also be a standalone component or included within the oil control valve 66. The object of the force determination module 230 is to maintain the force of the solenoid despite the fluctuation in the actual voltage. That is, when the actual voltage varies from the nominal voltage, the voltage correction module 234 or 234' generate a correction factor for the integral correction and the proportional correction so that a corrected proportional correction and a corrected integral correction allow a substantially uniform force to be provided at the solenoid.

Figure 5:
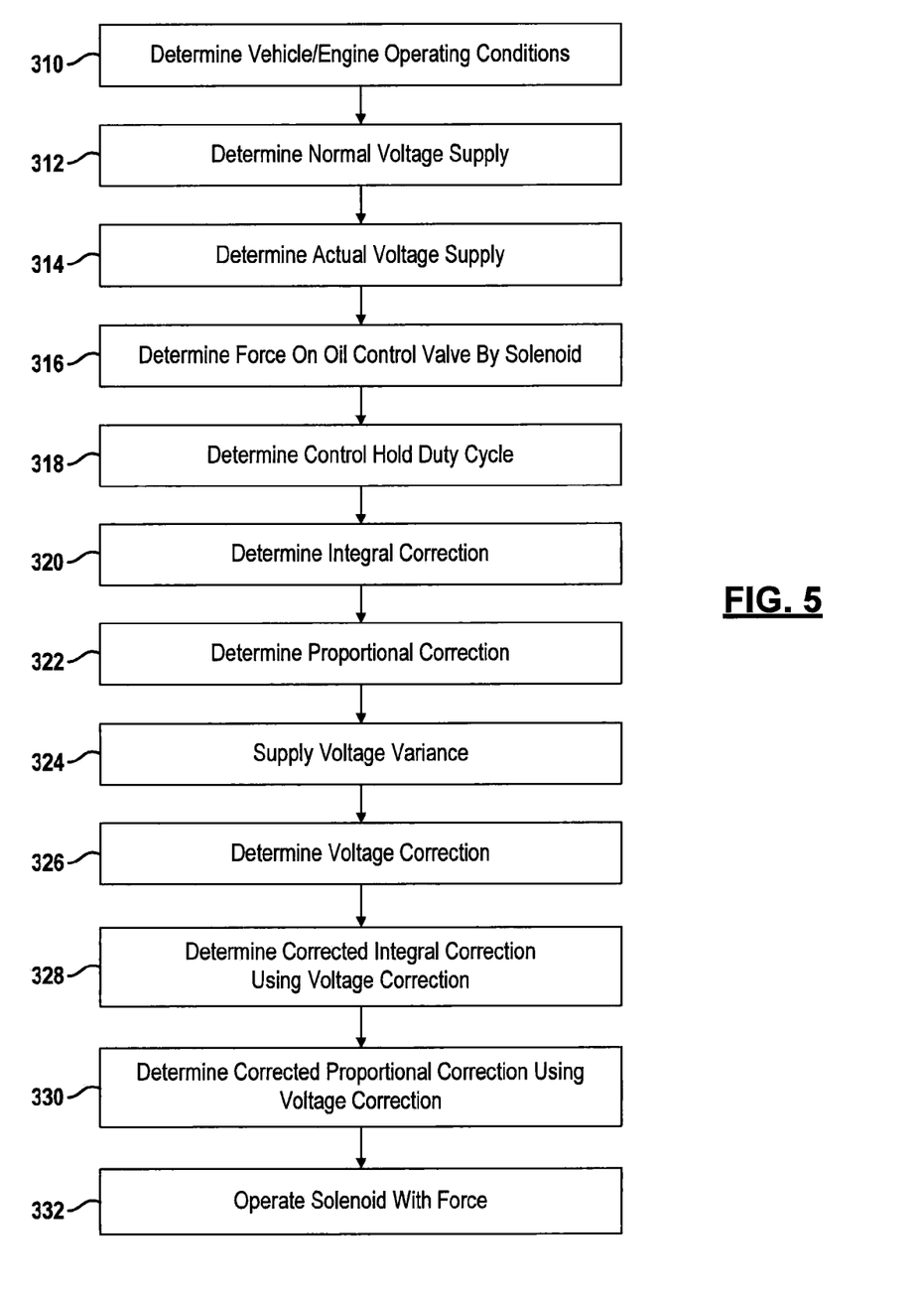
FIG. 5 is a flowchart illustrating a method for controlling a solenoid force according to the present disclosure.

Referring now to FIG. 5, a method for operating a solenoid for an oil control valve is set forth. In step 310, the vehicle and engine operating conditions are determined. Various vehicle and engine operating conditions may include inputs from various sensors such as those set forth in FIG. 2. The various sensor signals may be used to determine the various calculations set forth below.

In step 310, a nominal voltage for the voltage supply is determined. The nominal voltage may be set as a predetermined voltage level or as a learned voltage level for the system. The nominal voltage is the voltage that is expected to be provided by the system.

In step 314, the actual voltage supplied by the voltage system, such as the regulated voltage control module, is determined.

In step 316, a first force corresponding to the force caused from current flowing through the solenoid, the physical properties and the current operating state is determined. The force may correspond to the following equation:

$$F = \frac{I^2}{2}\frac{dL}{dx} \qquad \text{Equation 1}$$

where F is the force on the solenoid, I is the solenoid current, L is the solenoid inductance, X is the solenoid position, and V is the solenoid voltage, and R is the solenoid coil resistance. Using Ohm's Law, V=IR. The force equation becomes $$F = \frac{V^2}{2R^2}\frac{dL}{dx} \qquad \text{Equation 2}$$

The relation of the actual operating voltage $V_{act}$ to the nominal value is set forth as:

$$V_{act} = kV_{nom} \qquad \text{Equation 3}$$

when simplified, $$F_{act} = \frac{V_{act}^2}{2R^2}\frac{dL}{dx} \qquad \text{Equation 4}$$

$$F_{act} = \frac{(kV_{nom})^2}{2R^2}\frac{dL}{dx} \qquad \text{Equation 5}$$

$$F_{nom} = \frac{F_{act}}{k^2} = \frac{(V_{nom})^2}{2R^2}\frac{dL}{dx} \qquad \text{Equation 6}$$

The force corresponds to the control duty cycle times the voltage. Thus, the force may be set forth by the relationship:

$$F \propto (DC_{prop} + DC_{int} + DC_{ch})*V \qquad \text{Equation 7}$$

which may be simplified $$F = (DC_{prop} + DC_{int})*V + (DC_{ch}*V) \qquad \text{Equation 8}$$

In conjunction with equations 5 and 6, equation 8 may be rewritten as $$F_{nom} = \frac{F_{act}}{k^2} = \frac{(DC_{prop} + DC_{int})}{k^2}*V_{act} + (DC_{ch}*V_{act}) \qquad \text{Equation 9}$$

where $DC_{prop}$ is the proportional correction, $DC_{int}$ is the integral correction, and $DC_{ch}$ is the control hold duty cycle.

Referring back to step 318, the control hold duty cycle $DC_{ch}$ may be calculated using the various inputs to the control hold duty cycle module 210 in FIG. 4.

In step 320, an integral correction $DC_{int}$ may be determined. In step 322, a proportional correction $DC_{prop}$ may also be generated.

A supply voltage variance 324 may be used to generate a voltage correction (k) in step 326.

In step 328, a corrected integral correction factor using the voltage correction determined in step 326 is determined. In step 330, a corrected proportional correction using the voltage correction from step 326 is determined. In step 332, the solenoid is operated with the force using the corrected integral correction, the proportional integral correction, and the control hold duty cycle. Both the proportional correction and the integral correction change the control hold duty cycle to adjust for the variance in the voltage. As is illustrated by equation 9, the square of the correction factor may be used to correct the sum of the corrected proportional correction factor and the corrected integral correction factor. But operating the solenoid with the force from step 332, the duty cycle is adjusted to obtain the desired force.

Figure 6A:
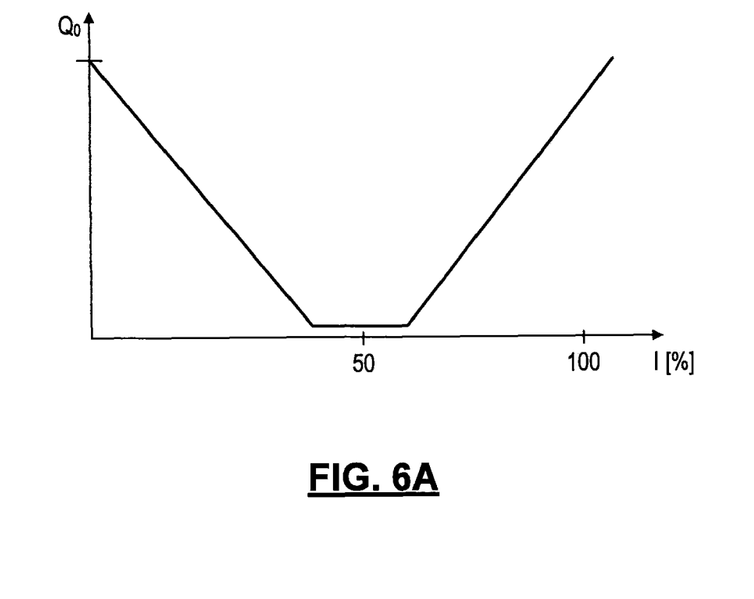
FIGS. 6A and 6B are alternative oil flow versus duty cycle plots according to the present disclosure.

Referring now to FIG. 6A, a plot of duty cycle versus oil flow is illustrated.

Figure 6B:
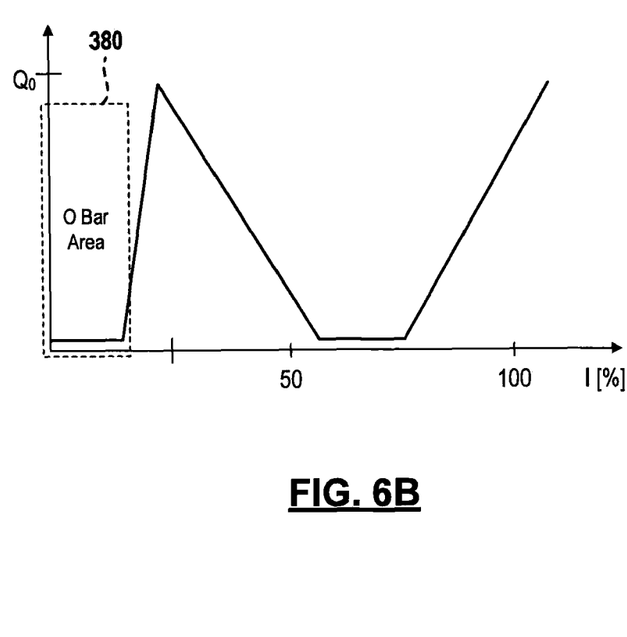

In FIG. 6B, an oil control flow is illustrated for a duty cycle in which a zero bar area 380 is provided. As can be seen, the slope of the oil flow is significantly in the present disclosure allows for such higher mechanical gain systems. Both of the systems illustrated in FIGS. 6A and 6B have a mid-park position. In FIG. 6A, the mid-park position is centered about 50% or at a 50% duty cycle. FIG. 6B has a mid-park position between 50 and 100% of the duty cycle.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:
controlling oil flow to a cam phaser through an oil control valve having an operator;
generating a force at the operator using by applying a first voltage from a voltage supply;
varying the first voltage from the voltage supply;
generating a first voltage correction factor based on the first voltage;
determining a corrected integral correction signal based on the first voltage correction factor;
determining a corrected proportional correction signal based on the first voltage correction factor;
calculating a desired force based on a sum of i) the corrected proportional correction signal and the corrected integral correction signal, and ii) a control hold duty cycle that is adjusted according to a voltage variance; and
maintaining the force on the operator by adjusting the force at the operator according to the desired force.

2. A method as recited in claim 1 wherein maintaining the force comprises controlling a duty cycle to the operator operating the oil control valve.

3. A method as recited in claim 1 further comprising generating a voltage correction signal based on an actual voltage and generating the corrected integral correction signal and the corrected proportional correction signal based on the actual voltage.

4. A method of controlling a cam phaser comprising:
generating a control hold duty cycle;
generating a voltage correction signal;
generating a proportional correction signal;
generating a corrected proportional correction signal based on the proportional correction signal and the voltage correction signal;
generating an integral correction signal;
generating a corrected integral correction signal based on the integral correction signal and the voltage correction signal, wherein the corrected integral correction signal is determined independently of the corrected proportional correction signal;

calculating a desired force based on a sum of i) the corrected proportional correction signal and the corrected integral correction signal, and ii) the control hold duty cycle, wherein the control hold duty cycle is adjusted according to a voltage variance; and controlling a duty cycle to a phaser operator based upon the control hold duty cycle, the corrected proportional correction signal and the corrected integral correction signal to maintain the desired force.

5. A method as recited in claim 4 wherein generating a voltage correction signal comprises generating the voltage correction signal based on a nominal system voltage and an actual system voltage.

6. A method as recited in claim 4 wherein generating the control hold duty cycle comprises generating the control hold duty cycle in response to a solenoid voltage.

7. A method as recited in claim 6 wherein generating the control hold duty cycle comprises generating the control hold duty cycle in response to a solenoid coil temperature signal.

8. A method as recited in claim 7 wherein generating the control hold duty cycle signal comprises generating the solenoid temperature signal based upon at least one of an induction air temp, an engine coolant temperature signal, a transmission temperature signal, an engine oil temperature signal and a vehicle speed signal.

9. A method as recited in claim 4 wherein generating the control hold duty cycle comprises generating the control hold duty cycle in response to an engine speed signal.

10. A method as recited in claim 4 wherein generating the control hold duty cycle signal comprises generating the control hold in response to an engine oil temperature signal.

11. A method as recited in claim 4 wherein generating the control hold duty cycle comprises generating the control hold duty cycle in response to a cam phaser position signal.

12. A method as recited in claim 4 wherein determining the control hold duty cycle comprises determining the control hold duty cycle in response to a nominal system voltage.

13. A method as recited in claim 4 wherein controlling the duty cycle to a phaser operator comprises controlling the duty cycle to a solenoid operating an oil control valve.

14. A control module comprising:
a control hold duty cycle module generating a control hold duty cycle signal;
a voltage correction module generating a voltage correction signal;
a correction module generating a corrected proportional correction signal based on a proportional correction signal and the voltage correction signal, and generating a corrected integral correction signal based on an integral correction signal and the voltage correction signal, wherein the corrected integral correction signal is determined independently of the corrected proportional correction signal; and
a force determination module that calculates a desired force based on a sum of i) the corrected proportional correction signal and the corrected integral correction signal, and ii) the control hold duty cycle, wherein the control hold duty cycle is adjusted according to a voltage variance, and that controls a duty cycle to a phaser operator based upon the control hold duty cycle, the corrected proportional correction signal and the corrected integral correction signal.

15. A control module as recited in claim 14 further comprising a look-up table for generating the voltage correction signal.

16. A control module as recited in claim 14 wherein the voltage correction module determines the voltage correction signal based on a nominal system voltage and an actual system voltage.

17. A control module as recited in claim 14 wherein the control hold duty cycle module determines the control hold duty cycle in response to at least one of a solenoid voltage, a solenoid coil temperature signal, an engine speed, an engine oil temperature signal, a cam phaser position signal, a cam phaser angle signal and a nominal system voltage.

18. A system comprising:
a control module as recited in claim 14;
an oil control valve operably connected to a cam phaser; and
a valve operator operating in response to the duty cycle.

19. A system as recited in claim 18 wherein the valve operator comprises a solenoid.

* * * * *